(12) United States Patent
Chen et al.

(10) Patent No.: US 8,719,622 B2
(45) Date of Patent: May 6, 2014

(54) RECORDING AND PREVENTING CRASH IN AN APPLIANCE

(75) Inventors: Li Ju Chen, Taipei (TW); Jeffrey C H Liu, Taipei (TW); Joey H Y Tseng, Taipei (TW); Jim C L Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 13/311,168

(22) Filed: Dec. 5, 2011

(65) Prior Publication Data

US 2012/0166893 A1    Jun. 28, 2012

(30) Foreign Application Priority Data

Dec. 27, 2010 (TW) ................................ 99146061 A

(51) Int. Cl.
*G06F 11/00* (2006.01)
(52) U.S. Cl.
USPC ........................................................... 714/10
(58) Field of Classification Search
USPC ........................................................... 714/10
See application file for complete search history.

(56) References Cited

U.S. PATENT DOCUMENTS

| | | | |
|---|---|---|---|
| 7,002,975 B2 | 2/2006 | Galicki et al. | |
| 7,139,925 B2 | 11/2006 | Dinker et al. | |
| 7,246,156 B2 | 7/2007 | Ginter et al. | |
| 7,526,758 B2* | 4/2009 | Hasse et al. | 717/133 |
| 7,551,552 B2 | 6/2009 | Dunagan et al. | |
| 7,562,351 B2 | 7/2009 | Haas et al. | |
| 7,620,730 B2 | 11/2009 | Theimer et al. | |
| 8,607,098 B2* | 12/2013 | Devegowda et al. | 714/38.1 |
| 2002/0145983 A1 | 10/2002 | Block et al. | |
| 2004/0054991 A1* | 3/2004 | Harres | 717/131 |
| 2005/0066235 A1* | 3/2005 | Lange-Last | 714/38 |
| 2005/0240806 A1* | 10/2005 | Bruckert et al. | 714/6 |
| 2007/0006170 A1* | 1/2007 | Hasse et al. | 717/131 |
| 2007/0283338 A1* | 12/2007 | Gupta et al. | 717/154 |
| 2010/0110903 A1 | 5/2010 | Spott et al. | |

OTHER PUBLICATIONS

Chandra; Co-designing the Failure Analysis and Monitoring of Large-Scale Systems; ACM Sigmetrics Performance Evaluation Review; vol. 36; Issue 2; Sep. 2008.

* cited by examiner

*Primary Examiner* — Bryce Bonzo
(74) *Attorney, Agent, or Firm* — David Mims; Robert C. Rolnik

(57) ABSTRACT

A computer implemented method for recording a crash in an appliance is provided. The method includes the following steps: running a core process to perform a transaction, which will make the core process undergo at least one state sequentially, wherein each state includes at least one call stack; executing a supervisor process to generate a state record, to sequentially record all undergone states of the core process in the transaction; in response to a crash of the core process in the transaction, generating a fault record to record all call stacks in a latest state of the core process; generating a crash report according to the state record and the fault record.

15 Claims, 6 Drawing Sheets

RECORDING AND PREVENTING CRASH IN AN APPLIANCE

BACKGROUND

This application claims the right of priority based on Taiwan Application No. 99146061, entitled "METHOD FOR RECORDING AND PREVENTING CRASH IN AN APPLIANCE", filed on Dec. 27, 2010, which is incorporated herein by reference and assigned to the assignee herein.

The present invention relates to a method for recording and preventing a crash in an appliance.

Unlike general-purpose computer devices, an appliance is typically designed to serve a specific purpose or provide a specific service and thus is more robust.

An appliance, such as an access point, a digital TV set-top box, or a network file-sharing server, performs a specific transaction for serving a specific purpose. For sophisticated appliances, please refer to IBM® Web Sphere® DataPower Series SOA Appliances or Tivoli® ISS Appliances® ("IBM," "WebSphere," and "Tivoli" are registered trademarks in the possession of International Business Machine in the United States and/or other countries).

Compared with general-purpose computer devices, "appliances" are relatively "closed"—their specific operating systems and applications (or drivers) vary with their intended purposes and services. In case a system crash happens to the "appliances," users cannot identify the cause of the crash and thus cannot troubleshoot it independently. When confronted with the crash, the only thing the users can do is to restart the affected appliances. However, just because the appliances restore their functions as a result of the restart, it does not mean the restart prevents the crash from happening again for the same reason.

SUMMARY OF THE INVENTION

A system crash happens to appliances for a variety of reasons. An aspect of the present invention is to provide a method for producing a crash report. The method entails recording undergone states and undertaken call stacks of an appliance in a transaction so as to record a specific system crash in a crash report to facilitate recognition thereof.

Another aspect of the present invention is to prevent the system crash from happening to the same appliances (i.e. repeated crashes) by making reference to the crash report.

Normally, appliances of the same model number have the same hardware and software/firmware which are usually unchangeable or only changeable through firmware update. Hence, a system crash that happens to an appliance is also likely to happen to another appliance of the same model number as the former. If, in a cluster of appliances, a crash report of an appliance is sent to other appliances, then the other appliances can prevent the system crash (i.e. cascaded crashes) by making reference to the crash report.

In an embodiment, a method for recording a crash in an appliance is provided. The method includes the steps of:
  running a core process to perform a transaction, the transaction making the core process undergo at least one state sequentially, wherein each state includes at least one call stack;
  executing a supervisor process to generate a state record, to sequentially record all undergone states of the core process in the transaction;
  generating a fault record in response to a crash of the core process in the transaction, to record all call stacks in a latest state of the core process; and
  generating a crash report according to the state record and the fault record.

In another embodiment, a method for preventing a crash in one or more appliances is provided. The method includes the steps of:
  running a core process to perform a first transaction, the first transaction making the core process undergo at least one state sequentially, wherein each state includes at least one call stack;
  executing a supervisor process to generate a first state record, to sequentially record all undergone states of the core process in the first transaction;
  generating a fault record in response to a crash of the core process in the first transaction, to record all call stacks in a latest state of the core process;
  generating a crash report according to the first state record and the fault record;
  running the core process to perform a second transaction, the second transaction making the core process undergo at least one state sequentially, wherein each state includes at least one call stack;
  executing the supervisor process to generate a second state record, to sequentially record all undergone states of the core process in the second transaction;
  comparing the crash report with the second state record, and if the second state record matches the first state record of the crash report, then:
  generating a stack record by the supervisor process, to record all call stacks after a latest state of the core process in the second transaction; and comparing the crash report with the stack record, and aborting the second transaction if the stack record matches the fault record in the crash report.

In short, in the embodiments mentioned above, by recording, in real-time, undergone states and undertaken call stacks of an appliance in a transaction, and then comparing with the aforementioned crash report, the system crash is prevented from happening again to the same appliances.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE PREFERRED EMBODIMENTS

Figure 1A:
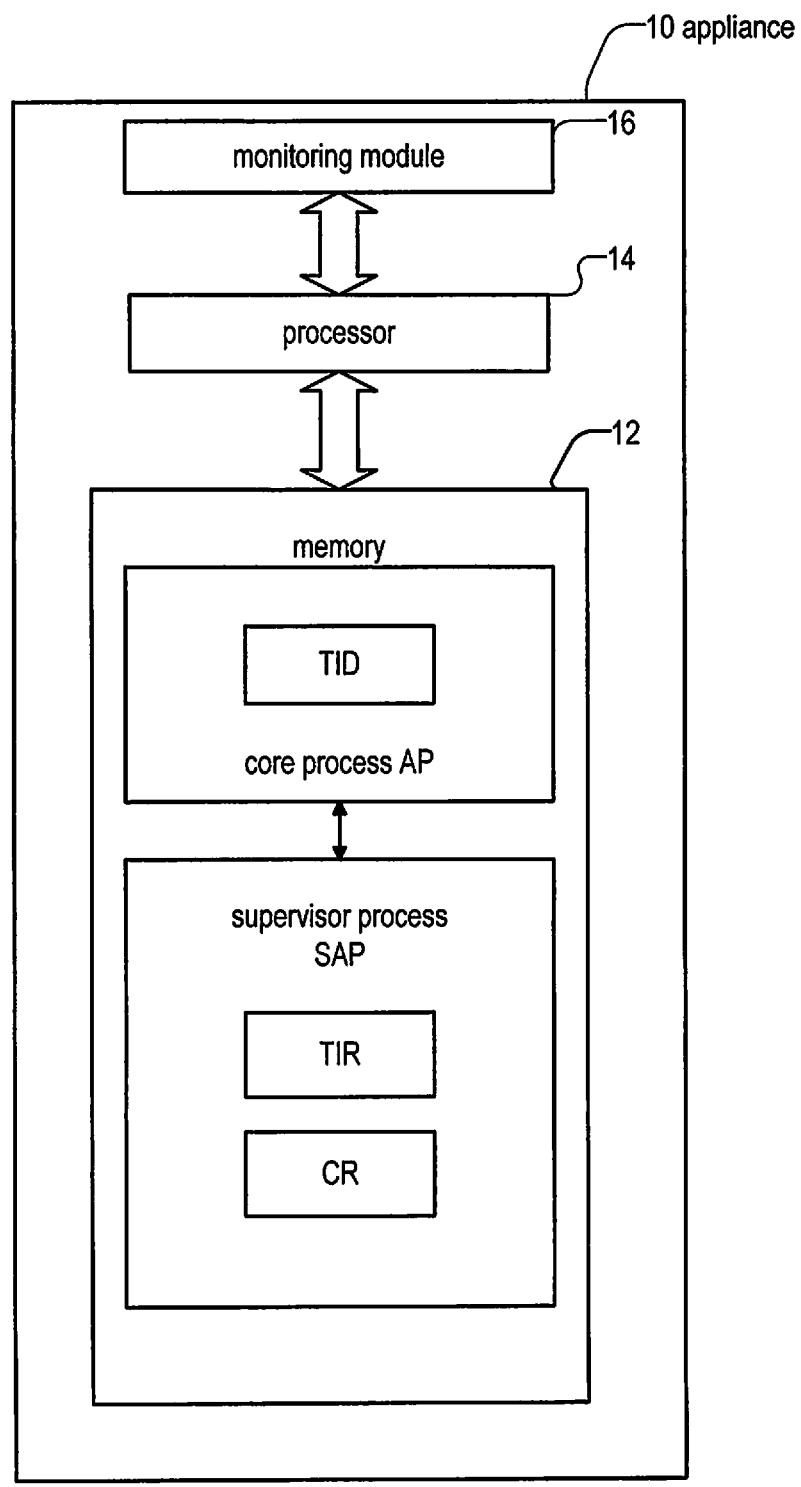
FIG. 1A is a schematic view of an appliance according to a specific embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as an appliance, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1A through FIG. 5, appliance methods, and computer program products are illustrated as structural or functional block diagrams or process flowcharts according to various embodiments of the present invention. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1A is a block diagram of an appliance 10 in an embodiment. In an embodiment, the appliance 10 can be further extended and changed, for example but not limited to, based on the hardware framework of IBM® Web Sphere® DataPower Series SOA Appliances or Tivoli® ISS Appliances®. In particular, the appliance 10 comprises a memory 12, a processor 14, and a monitoring module 16. The memory 12 is a computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. A program code of a core process AP is stored in the memory 12. The processor 14 accesses the memory 12 to run the core process AP.

Figure 1B:
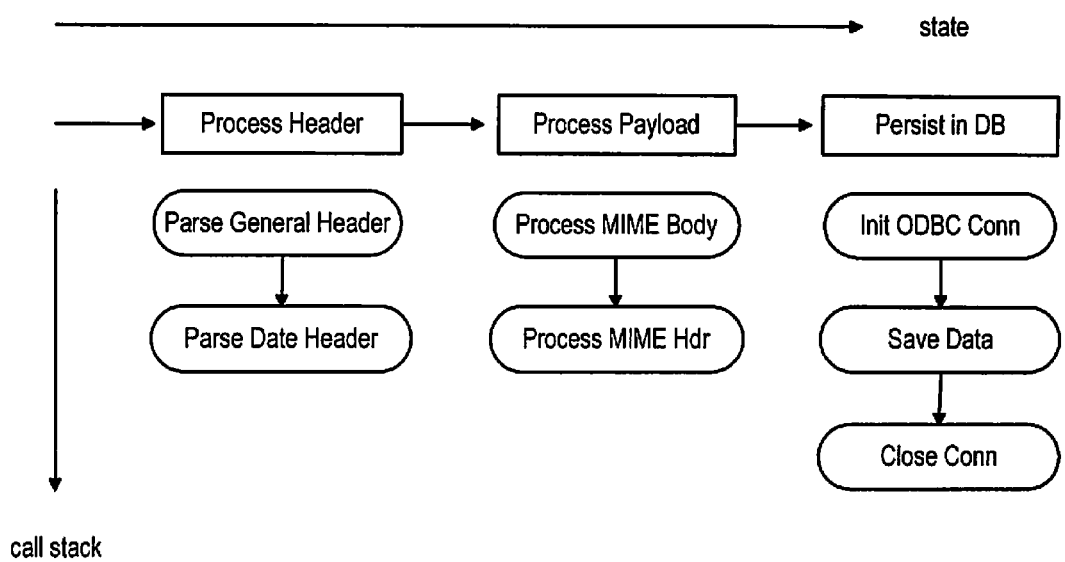
FIG. 1B is a schematic view of states and call stacks of a core process in a transaction according to a specific embodiment of the present invention.

FIG. 1B shows states of the core process AP run by the processor 14, of FIG. 1A, in a transaction. For states or program states, please refer to http://en.wikipedia.org/wiki/Program_state). For call stacks (stacks, call stacks, or process stacks), please refer to http://en.wikipedia.org/wiki/call_stack). The states of the core process AP are illustrated with and exemplified by a usage scenario of IBM® Web-Sphere® DataPower Series SOA Appliances. The aforesaid "states" mean the statuses of a process from a conceptual perspective and can be preset by a programmer. The aforesaid "call stacks" correspond to "functions," respectively.

As shown in FIG. 1B, to perform the transaction, the core process AP undergoes three states in sequence, namely "Process Header," "Process Payload," and "Persist in Database". In state "Process Header," the core process AP executes call stacks "ParseGeneralHeader" and "ParseDateHeader" in sequence. In state "Process Payload," the core process AP executes call stacks "ProcessMIMEBody" and "ProcessMIMEHdr" in sequence. In state "Persist in Database," the core process AP executes call stacks "InitODBCConn," "SaveData," and "CloseConn" in sequence.

Referring to FIG. 1A again, the monitoring module 16 monitors the states and the call stacks of the core process AP, and related details, which are described later. In an embodiment, the monitoring module 16 mainly comes in the form of a hardware module, and has its own processor and memory (not shown). The monitoring module 16 monitors the operation of the core process. However, in another embodiment, the monitoring module 16 comes in the form of a software module, such that the processor 14 executes a supervisor process SAP stored in the memory 12 so as to monitor the operation of the core process AP. A point to note is that a conventional supervisor process SAP (or the monitoring module 16) can monitor a watchdog timer (see http://en.wikipedia.org/wiki/Watchdog_timer) of the core process. By contrast, the supervisor process SAP (or the monitoring module 16) of the present invention can further monitor the states and the call stacks of the core process AP.

Figure 2:
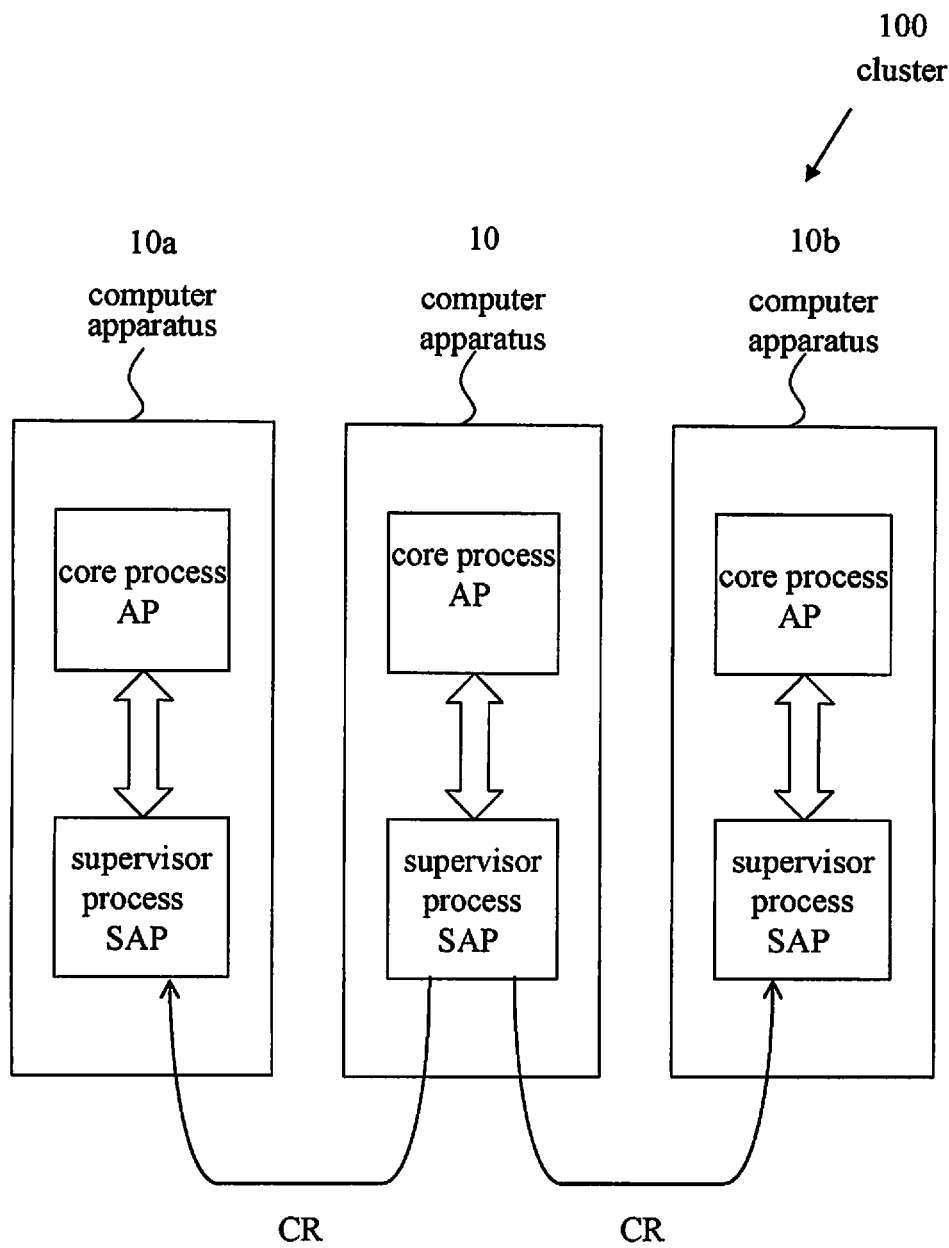
FIG. 2 is a schematic view of a cluster according to a specific embodiment of the present invention.

FIG. 2 is a block diagram of a cluster 100 in an embodiment, wherein the cluster 100 has at least two appliances, such as appliances 10, 10a, and 10b. The appliances 10a, 10b have the same software/hardware framework as the appliance 10 shown in FIG. 1, and thus can execute the same core process AP and supervisor process SAP. The appliances 10, 10a, 10b are connected to each other by a network (such as LAN, WAN, or the Internet) or by any other means of data connection. In another embodiment, the appliances 10, 10a, 10b in the cluster 100 fall within the same realm, and are verified beforehand by the same verification mechanism and managed by the same rule. For a "realm," please refer to the U.S. Pat. No. 5,544,322 issued to the applicant of the present invention. Also, the appliances 10, 10a, 10b in the cluster 100 can operate in the form of clustering nodes or standby nodes. When functioning as clustering nodes, the appliances 10, 10a, 10b operate concurrently to effectuate load balancing. When functioning as standby nodes, if one of the appliances (such as the appliance 10a) crashes, another of the appliances (such as the appliance 10b) will start to operate. As shown in FIG. 2, if one of the appliances (such as the appliance 10) crashes, its supervisor process SAP generates and sends a crash report CR to the supervisor process SAP of another of the appliances (such as the appliance 10a or 10b), such that the other appliances can prevent cascaded crashes by making reference to the crash report CR. Further details are described below.

Figure 3:
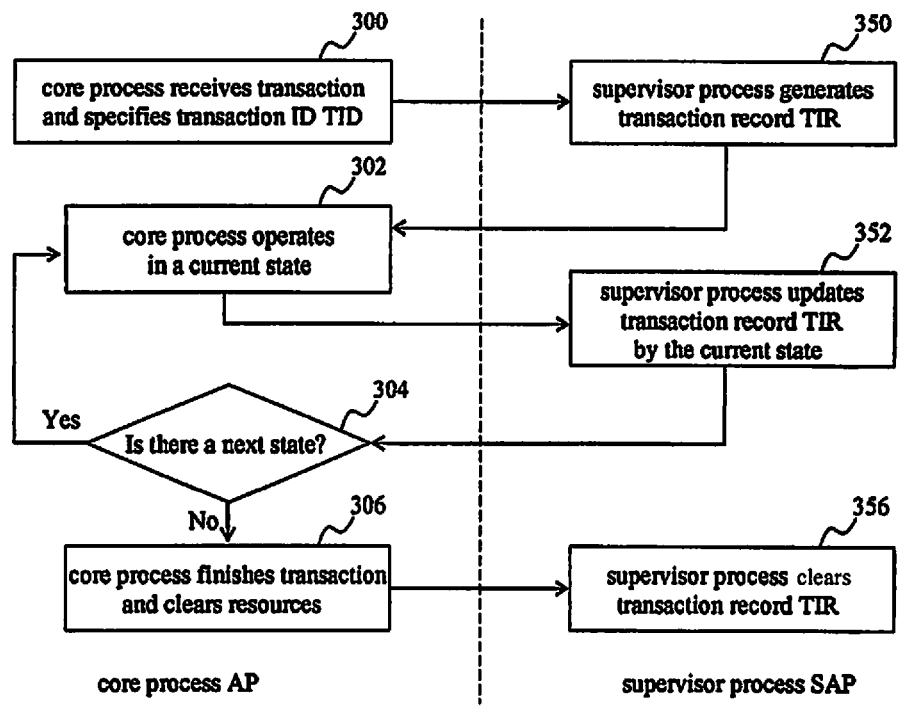
FIG. 3 is a flow chart of a method according to a specific embodiment of the present invention.

FIG. 3 is a flow chart of a method according to a specific embodiment of the present invention, wherein the appliance 10 performs transaction well without experiencing a crash. The steps taken by the core process AP are shown on the left-hand side of FIG. 3. The steps taken by the supervisor process SAP (or the monitoring module 16) are shown on the right-hand side of FIG. 3.

step 300: the core process AP receives a request for performing a transaction, and the core process AP specifies a transaction ID (TID) for the transaction.

step 350: the supervisor process SAP generates a transaction information record (TIR) dedicated to the transaction according to the TID.

step 302: the core process AP starts operating in a current state (such as the state "Process Header" shown in FIG. 1B) and informs the supervisor process SAP of this.

step 352: as with step 302, the supervisor process SAP updates a state record in the TIR by the current state (such as "Process Header"). In this embodiment, it is not necessary for the supervisor process SAP to know what call stacks (such as call stacks "ParseGeneralHeader" and "ParseDateHeader" shown in FIG. 1B) are undertaken by the core process AP in this state.

step 304: the core process AP determines whether there is a next state. In response to an affirmative determination, the process flow of the method of FIG. 3 goes to step 302 again, treating the next state (such as the state "Process Payload" shown in FIG. 1B) as the current state of operation, and informing the supervisor process SAP of this. In response to a negative determination, the process flow of the method of FIG. 3 goes to step 306.

step 306: the core process AP finishes the transaction successfully and clears transaction resources which might otherwise be occupied.

step 356: as with step 306, the supervisor process SAP clears the TIR.

Figure 4:
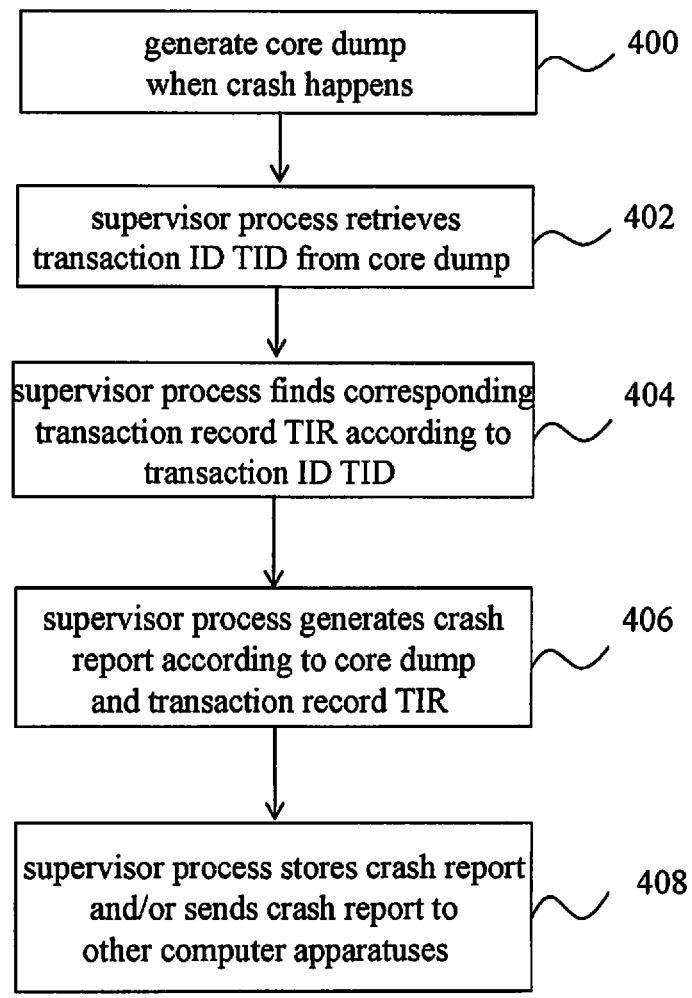
FIG. 4 is a flow chart of a method according to a specific embodiment of the present invention.

FIG. 4 is a flow chart of a method according to a specific embodiment of the present invention, depicting all the steps in which, after undertaking call stacks in specific states and then ending up with a crash, the core process AP generates the crash report CR.

step 400: in response to a crash of the core process AP, the appliance 10 (of FIG. 1A) generates a core dump when the crash happens. For a description of a core dump and a way of producing the core dump, please refer to http://en.wikipedia.org/wiki/Core_dump. The description of the core dump is incorporated herein by reference.

step 402: the supervisor process SAP (or the monitoring module 16) retrieves the transaction ID (TID) from a core dump.

step 404: the supervisor process SAP finds a corresponding TIR according to the TID.

step 406: the supervisor process SAP generates the crash report CR according to the core dump and the TIR. A point to note is that in the core dump and a related portion of this embodiment is a call stack undertaken in the latest state (i.e. the state in which the crash happens). Take FIG. 1B as an example, if a crash happens to the core process AP in the state "Process Payload," the core dump will have a stack record of the crash that happens in the state "Process Payload". The supervisor process SAP primarily needs the stack record of the crash in order to produce the crash report CR.

step 408: the supervisor process SAP stores the crash report CR in the memory 12 (e.g. as shown in FIG. 1A), and sends the crash report CR to the supervisor process SAP (or the monitoring module 16) of the appliance 10a or 10b as needed.

Figure 5:
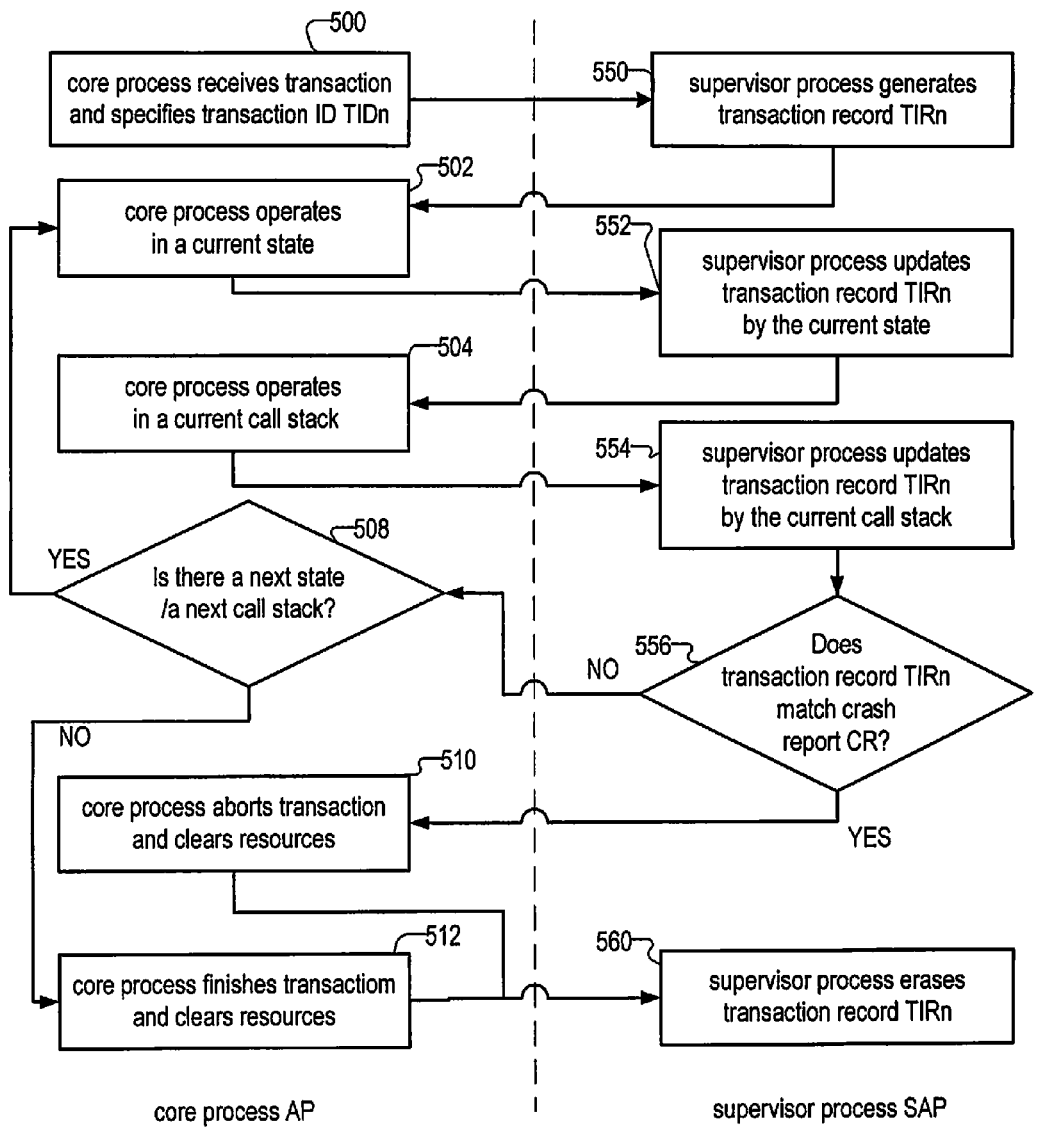
FIG. 5 is a flow chart of a method according to a specific embodiment of the present invention.

FIG. 5 is a flow chart of a method according to a specific embodiment of the present invention, depicting the steps taken to prevent repeated crashes from happening to the same appliance (such as the appliance 10) and prevent cascaded crashes from happening to another appliance (such as the appliance 10a or 10b) according to the crash report CR sent or stored in step 408 of FIG. 4. The steps taken by the core process AP are shown in the left-hand side of FIG. 5. The steps taken by the supervisor process SAP (or the monitoring module 16 of FIG. 1) are shown in the right-hand side of FIG. 5.

Unlike FIG. 3 which depicts a normal operation mode, FIG. 5 illustrates a "restricted mode" of operation. The "restricted mode" in FIG. 5 requires additional steps of making reference to a crash report for preventing a crash. However, the additional steps are likely to compromise the efficiency of the system. Hence, users may determine whether to enter the "restricted mode" as needed.

step 500: the core process AP receives a request for performing a new transaction, and the core process AP specifies a transaction ID TIDn for the new transaction, as described in step 300.

step 550: the supervisor process SAP generates a transaction record TIRn dedicated to the new transaction according to the TIDn. A point to note is that the TIR described in FIG. 3 is different from the TIRn in step 550. The former (in the normal mode) only has a record of state transition (i.e. state history). The latter (in the restricted mode) not only has a state record, but also has a stack record in each state.

step 502: the core process AP starts to operate in a current state and informs the supervisor process SAP of this.

step 552: as with step 302, the supervisor process SAP updates a state record in the TIRn by the current state.

step 504: the core process AP starts to operate in a current call stack (such as the call stack "ParseGeneralHeader" shown in FIG. 1B) in the current state and informs the supervisor process SAP of this.

step 554: as with step 502, the supervisor process SAP updates the stack record in the TIRn in the current state by the current call stack.

step 556: the supervisor process SAP determines whether the TIRn and the crash report CR match, wherein the supervisor process SAP compares the state record in the TIRn with the state record in the TIR in the crash report CR. If a match is not found, the supervisor process SAP will determine that the TIRn does not match the crash report CR, and the process flow of the method will go to step 508. If the supervisor process SAP determines that the state record in the TIRn matches the state record in the TIR in the crash report CR, the supervisor process SAP will compare the stack record in the TIRn in the current state with the stack record recorded by a core dump in the crash report CR. If a match is not found, the supervisor process SAP will determine that the TIRn does not match the crash report CR, and the process flow of the method will go to step 508. If a match is found, the process flow of the method will go to step 510.

step 508: the core process AP determines whether there is a next state or a next call stack. If there is a next state, the process flow of the method will go back to step 502. If there is a next call stack, the process flow of the method will go back to step 504. If there is none, the process flow of the method will go to step 512.

step 510: the core process AP aborts the new transaction and clears the transaction resources which might otherwise be occupied.

step 512: the core process AP finishes the new transaction successfully and clears the transaction resources which might otherwise be occupied.

step 560: as with step 510 or 512, the supervisor process SAP clears the TIRn.

The present invention is not restrictive of a way of determining whether TIRn matches the crash report CR (step 556). In an embodiment, in the appliances states and call stacks which are required for performing a specific transaction can usually be predefined, and thus it is easy to denote the states and the call stacks by different code numbers which are integers or give specific names to the states and the call stacks, thereby rendering it easy to compare and determine whether the states (or the call stacks) match.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A computer implemented method for recording a crash in an appliance, the computer implemented method comprising:
    running a core process to perform a transaction, the transaction making the core process undergo at least one state sequentially, wherein each state includes at least one call stack;
    executing a supervisor process to generate a state record, to sequentially record all undergone states of the core process in the transaction;
    generating a fault record in response to a crash of the core process in the transaction, to record all call stacks in a latest state of the core process; and
    generating a crash report according to the state record and the fault record.

2. The computer implemented method of claim 1, wherein generating the crash report further comprises the core process specifying a transaction ID for the transaction and the core process adding the transaction ID to the crash report.

3. The computer implemented method of claim 1, wherein executing the supervisor process to generate the state record further comprises updating the state record by the supervisor process in response to each undergone state of the core process.

4. The computer implemented method of claim 1, further comprising obtaining the fault record from a core dump in response to the crash.

5. A computer program product comprising one or more computer-readable tangible storage devices and:
   computer-readable program instructions, which are stored on the one or more computer-readable tangible storage devices and, when executed by one or more processors, perform the computer implemented method of claim 1.

6. A computer implemented method for preventing a crash in one or more appliances, the computer implemented method comprising:
   running a core process to perform a first transaction, the first transaction making the core process undergo at least one state sequentially, wherein each state includes at least one call stack;
   executing a supervisor process to generate a first state record, to sequentially record all undergone states of the core process in the first transaction;
   generating a fault record in response to a crash of the core process in the first transaction, to record all call stacks in a latest state of the core process;
   generating a crash report according to the first state record and the fault record;
   running the core process to perform a second transaction, the second transaction making the core process undergo at least one state sequentially, wherein each state includes at least one call stack;
   executing the supervisor process to generate a second state record, to sequentially record all undergone states of the core process in the second transaction;
   comparing the crash report with the second state record;
   in response to the second state record matching the first state record, generating a stack record by the supervisor process, to record all call stacks after the latest state of the core process in the second transaction; and
   in response to the second state record matching the first state record, comparing the crash report with the stack record, and
   in response to the second state record matching the first state record and in response to the crash report matching the fault record, aborting the second transaction.

7. The computer implemented method of claim 6, wherein executing the supervisor process to generate the second state record further comprises updating the second state record after each undergone state of the core process in the second transaction, wherein comparing the crash report with the second state record comprises comparing the crash report with the second state record after each undergone state of the core process.

8. The computer implemented method of claim 6, wherein generating the stack record by the supervisor process further comprises updating the stack record after each undertaken call stack of the core process in the second transaction, wherein comparing the crash report with the stack record comprises comparing the crash report with the stack record after each undertaken call stack of the core process.

9. The computer implemented method of claim 6, further comprising obtaining the fault record from a core dump in response to the crash.

10. The computer implemented method of claim 6,
    wherein running the core process to perform the first transaction comprises a first appliance running the core process to perform the first transaction;
    wherein executing the supervisor process to generate the first state record comprises the first appliance executing the supervisor process to generate the first state record;
    wherein generating the fault record in response to the crash of the core process in the first transaction comprises the first appliance generating the fault record in response to the crash of the core process in the first transaction;
    wherein generating the crash report according to the first state record and the fault record comprises the first appliance generating the crash report according to the first state record and the fault record;
    wherein running the core process to perform the second transaction comprises a second appliance running the core process to perform the second transaction;
    wherein executing the supervisor process to generate the second state record comprises the second appliance executing the supervisor process to generate the second state record;
    wherein comparing the crash report with the second state record comprises the second appliance comparing the crash report with the second state record;
    wherein generating the stack record by the supervisor process comprises the second appliance generating the stack record by the supervisor process;
    wherein comparing the crash report with the stack record comprises the second appliance comparing the crash report with the stack record; and
    wherein running the core process to perform the second transaction occurs after sending the crash report from the first appliance to the second appliance.

11. The computer implemented method of claim 10, further comprising putting the first appliance and the second appliance in a cluster.

12. A computer program product comprising one or more computer-readable tangible storage devices and:
    computer-readable program instructions, which are stored on the one or more computer-readable tangible storage devices and, when executed by one or more processors, perform the computer implemented method of claim 6.

13. An appliance, comprising:
    a memory;
    a processor for running a core process to perform a first transaction, the first transaction making the core process undergo at least one state sequentially, wherein each state includes at least one call stack; and
    running a supervisor process for generating a first state record, to sequentially record all undergone states of the core process in the first transaction and for obtaining a fault record according to a core dump of the appliance, the fault record recording all call stacks in a latest state of the core process; and
    wherein the supervisor process generates a crash report according to the state record and the fault record and stores the crash report in the memory.

14. The appliance of claim 13, wherein the processor further runs the core process to perform a second transaction, the second transaction comprising at least one state, each at least one state including at least one call stack, and a monitoring module performing the steps of:
    a monitoring module generating a second state record to sequentially record all undergone states of the core process in the second transaction;

the monitoring module comparing the crash report with the second state record, and if the second state record matches the first state record in the crash report, then:

the monitoring module generating by the supervisor process a stack record to record all call stacks after a latest state of the core process in the second transaction; and the monitoring module comparing the crash report with the stack record, and aborting the second transaction if the stack record matches the fault record in the crash report, wherein the monitoring module executes on the processor.

15. An appliance cluster, comprising:

a first appliance, the first appliance comprising:
- a first processor for running a first core process to perform a first transaction, the first transaction making the first core process undergo at least one state sequentially, wherein each state includes at least one call stack;
- a first supervisor process for generating a first state record, to sequentially record all undergone states of the first core process in the first transaction and obtaining a fault record according to a core dump of the first appliance, the fault record recording all call stacks in a latest state of the core process;
- wherein the supervisor process generates a crash report according to the state record and the fault record and sends the crash report to a second appliance; and the second appliance comprising:
- a memory for storing the crash report sent from the first appliance;
- a second processor for running a second core process to perform a second transaction, the second transaction making the second core process undergo at least one state sequentially, wherein each at least one state includes at least one call stack;

the second processor executing a second supervisor process for performing the following steps:
- the second processor generating a second state record, to sequentially record all undergone states of the second core process in the second transaction;
- the second processor executing comparing the crash report with the second state record;
- in response to the second state record matching the first state record, the second supervisor process generating a stack record, to record all call stacks in a latest state of the second core process in the second transaction;
- in response to the second state record matching the first state record, the second supervisor process comparing the crash report with the stack record; and
- in response to the stack record matching the fault record the second supervisor process aborting the second transaction.

* * * * *